UNITED STATES PATENT OFFICE.

JOHN NORTH, OF KEOKUK, IOWA.

IMPROVEMENT IN PROCESSES FOR PREVENTING INCRUSTATION IN STEAM-BOILERS.

Specification forming part of Letters Patent No. 199,309, dated January 15, 1878; application filed November 9, 1877.

*To all whom it may concern:*

Be it known that I, JOHN NORTH, of Keokuk, in the county of Lee, in the State of Iowa, have invented a new, useful, and important process, fully set forth in this specification, for preventing scale or incrustation, and for removing the same, if formed, in locomotive and other steam-generating boilers, of which the following is a specification:

Water, in many localities, is found by analysis to contain carbonic-acid gas, sulphate of lime, carbonate of lime, and carbonate of magnesium. In generating steam in an iron boiler from such water sulphate of lime, carbonate of lime, carbonate of magnesium, and carbonate of iron are precipitated, and adhere to the boiler in incrustation. The heat-conducting power of the incrustation is only about one-thirty-seventh of that of iron. Therefore, as the incrustation increases in the boiler, a greater expenditure of fuel is required to generate steam. The excessive degree of heat necessary burns the iron in contact with the fire, and renders the boiler weak and liable to explode under the pressure of steam.

To prevent the incrustation in steam-generating boilers, and to remove it from boilers in which it has formed, thus avoiding the extra expenditure of fuel and the weakening of the boiler from excessive heat, while facilitating the production of steam, is the object of my invention.

My process is to treat the water, at its ordinary temperature, in proportion to the sulphate of lime, carbonic-acid gas, carbonate of lime, and carbonate of magnesium found therein by analysis, with about equal quantities of carbonate of sodium and chloride of ammonium, before they are mixed, to change the sulphate of lime to carbonate of lime and absorb the carbonic-acid gas, and then heating the water to change the carbonates into chlorides which are soluble at any temperature of the water.

Sulphate of lime is soluble in cold water, but is almost insoluble in hot water. Therefore, as soon as the water is heated, the sulphate of lime is precipitated. Carbonate of lime is almost insoluble in pure cold water, but is held in solution by the free carbonic-acid gas in the water. Heat drives off this gas, and the carbonate is precipitated. Carbonate of magnesium acts in the same manner as carbonate of lime. Carbonic-acid gas in solution in an iron boiler unites with the iron, and forms carbonate of iron, which is insoluble.

When carbonate of sodium is added to water containing sulphate of lime in solution there is a double decomposition, and there is formed sulphate of sodium, which is soluble, and does no harm in the boiler. Carbonate of lime is also produced. The excess of lime and sodium in the water absorbs the free carbonic-acid gas. When chloride of ammonium is added to water containing carbonate of lime there is a double decomposition, and there is formed chloride of lime, which is soluble, and carbonate of ammonium, which is volatile. Chloride of ammonium has a similar action on carbonate of magnesium.

The quantity and proportion of carbonate of sodium and chloride of ammonium depend upon the quantity and proportion of lime and magnesium in the water. It generally takes equal amounts of each. I analyze the water and determine these amounts.

The carbonate of sodium and chloride of ammonium must not be mixed before adding to the water, as they would decompose each other, which they will not otherwise do, as the sulphuric acid, in connection with the lime, has more affinity for the sodium than for the lime or anything else in the water. It therefore separates from the lime, and drives the carbonic acid from the sodium, and unites with sodium to form sulphate of sodium. The lime and carbonic acid unite to form carbonate of lime. At the ordinary temperature of water the chloride of ammonium remains in solution. It requires heat to cause it to act with the carbonate of lime.

A proper proportion of the chemicals should be put into the water to be used each day.

The water may be heated before being put into the boiler to complete the chemical changes; but the heat in the boiler will accomplish the same result. The water will then not need filtration, the chlorides formed being soluble.

The carbonic-acid gas being neutralized or absorbed, carbonate of iron will not be formed in the boiler. The chlorides of lime and magnesium and the sulphate of sodium being soluble at all temperatures of the water, and the carbonate of ammonium being volatile, they will not form scale or incrustation.

My process is cheap and effectual. It does not injure the boiler, but tends to prevent rusting. It causes old incrustations gradually to become loosened and decomposed. It saves fuel, and facilitates the production of steam. It also renders explosion less liable.

I claim—

The process of preventing scale or incrustation in locomotive and other steam-generating boilers, and of removing it if formed, by treating the water at its ordinary temperature, first with carbonate of sodium, and afterward with chloride of ammonium, in about equal quantities, the salts being added separately, and then heating the water, substantially as described.

In witness whereof I hereunto subscribe my name, in presence of two attesting witnesses, this 3d day of November, 1877.

JOHN NORTH.

Witnesses:
  G. S. FULLER,
  GEO. F. JENKINS.